US006413340B1

(12) United States Patent
Anbo et al.

(10) Patent No.: US 6,413,340 B1
(45) Date of Patent: Jul. 2, 2002

(54) METHOD FOR THE PREPARATION OF LAMINATED INDUCTOR DEVICE

(75) Inventors: Toshiyuki Anbo; Fumio Uchikoba; Toshihiro Abe; Akihiro Sasaki, all of Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/421,012

(22) Filed: Oct. 20, 1999

(30) Foreign Application Priority Data

Oct. 20, 1998 (JP) .......................................... 10-297892
Sep. 24, 1999 (JP) .......................................... 11-270770

(51) Int. Cl.[7] .......................... B32B 31/26; H01F 41/04

(52) U.S. Cl. ............................... 156/89.12; 156/89.16; 156/234; 156/235; 156/257; 156/277; 29/851

(58) Field of Search .......................... 156/89.12, 89.16, 156/247, 248, 249, 252, 256, 257, 289, 277, 234, 235; 29/851

(56) References Cited

U.S. PATENT DOCUMENTS 5,476,728 A * 12/1995 Nakano et al.
5,573,620 A * 11/1996 Sakai et al. ................. 156/249
5,792,293 A * 8/1998 Inasaka ................... 156/89.16
6,189,200 B1 * 2/2001 Takeuchi et al. ..... 156/89.12 X
6,218,925 B1 * 4/2001 Iwao
6,223,422 B1 * 5/2001 Takeuchi et al.

FOREIGN PATENT DOCUMENTS

JP 5-36568 2/1993
JP 7-192955 7/1995
JP 8-222474 * 8/1996

* cited by examiner

*Primary Examiner*—Curtis Mayes
(74) *Attorney, Agent, or Firm*—Wenderoth, Lind & Ponack, L.L.P.

(57) ABSTRACT

In the method for the preparation of a laminated ferrite inductor device comprising the steps of: laminating a ferrite green sheet lined with and supported by a substrate film of, for example, polyethylene terephthalate provided with a penetrating through-hole and a coil pattern to a second ferrite green sheet followed by removal of the substrate film by peeling to form a laminate of ferrite green sheets to be subjected to sintering, peelability of the substrate film from the ferrite green sheet can be improved to prevent the ferrite green sheet from occurrence of defects such as breaking, crease formation and stretching by providing a snap groove of an adequate incision depth having a rectangular profile of a frame and, along the outer periphery of the snap groove, a peel-facilitating reinforcement pattern by printing with a printing paste to have a specified line width and printing thickness.

6 Claims, 7 Drawing Sheets

METHOD FOR THE PREPARATION OF LAMINATED INDUCTOR DEVICE

BACKGROUND OF THE INVENTION

The present invention relates to an improvement in the method for the preparation of a laminated inductor device. More particularly, the invention relates to an improvement in the method for the preparation of a surface-mountable laminated inductor device of high performance for accomplishing higher quality of the products and higher efficiency of the preparation process.

As a general trend of the market demand, electronic instruments are desired to be more and more compact and the parts constituting the instrument also must be more and more compact accordingly.

Some of electronic parts such as inductors, capacitors and the like which are heretofore designed to be provided with lead terminals can now be more compact by the application of a recently developed technology in which ceramic layers in a specific patterned form and metallic layers consisting a laminated body are subjected to a simultaneous sintering treatment to form a monolithic structure provided with internal conductors.

As a trend in recent years, chip capacitors and chip resistors are under shift toward the 1005 form. Chip inductors are also desired to be in a more compact size.

In the preparation of a laminated inductor device, a powder of a ceramic material such as ferrites is first blended and slurried with a binder and an organic solvent to give a pasty mixture which is applied onto a substrate film such as a polyethylene terephthalate film and the like by using a doctor blade or other suitable coating means followed by drying to form a so-called ceramic green sheet. Thereafter, through-holes are formed to penetrate this ceramic green sheet by machining or laser working and a coil pattern is formed thereon by the method of screen printing with a silver- or silver/palladium-based electroconductive paste. In this case, electroconduction between two layers is obtained by the conductive paste filling the through-holes.

In the next place, a plurality of the thus printed ceramic green sheets are laid one on the other and bonded together by compression under heating to give a laminated block which is cut into a desired form of chips followed by removal of the binder and sintering. The thus sintered chips are ground and provided with electrode terminals followed by a further heat treatment and final electrolytic plating treatment to form a coating layer on the electrode terminals.

An example of the thus obtained chip inductors is illustrated in FIG. 1 by a perspective view showing the internal structure having a coil F, internal conductors M and through-holes S for electric conduction. FIG. 2 is a flow sheet diagram showing an example of the preparation process of such a chip inductor.

It is of course indispensable in the above described process for the preparation of chip inductors that the step of lamination of the ceramic green sheets is preceded by removal of the substrate film by peeling off the ceramic green sheet in each of the laminated bodies.

When the size of the thus prepared chip inductors is relatively large as is mostly the case heretofore, the cross section of the coil can be large enough so that, while a coil of five turns is usually sufficient, the thickness of the ceramic green sheet can be about 50 μm at the smallest and no difficulty is encountered in the removal of the substrate film by peeling. When the chip size is greatly decreased to comply with the recent requirement as is the case in the 1005 form, for example, the cross sectional area of the coil is necessarily so limited that a desired inductance can be obtained only by increasing the number of turns of the coil.

As a consequence, the thickness of the ceramic green sheet must be decreased to be 20 μm or even smaller. When a ceramic green sheet of such a small thickness is separated from the substrate film by peeling, troubles are sometimes unavoidable including breaking of the ceramic green sheet, formation of creases and stretching of the sheet.

In the laminated inductors, moreover, the above described troubles are even more remarkable because it is sometimes unavoidable that punching of a penetrating through-hole results in a decrease in the planarity or flatness of the ceramic green sheet and the difficulty in peeling of the substrate film is increased so much by the adhesive electroconductive paste filling the through-holes.

The above mentioned troubles taking place in the ceramic green sheet by the removal of the substrate film lead to a drawback such as displacement of the ceramic green sheets under lamination. This problem is so serious, especially, when the chip size is small resulting in a decrease of or even total loss of the performance as an inductor device.

It is accordingly desired to develop a method by which the substrate film can be removed from a ceramic green sheet having a so small thickness of 30 to 20 μm or even smaller without troubles such as breaking, crease formation and stretching of or in the ceramic green sheet.

Several methods are proposed heretofore to overcome the above mentioned difficulties in the removal of the substrate film from a ceramic green sheet or, in particular, ferrite green sheet of a so small thickness. Instead of laying two ceramic green sheets each freed from the substrate film, for example, ceramic green sheets each lined with a substrate film are laminated as such followed by removal of the substrate film. Thereafter, another ceramic green sheet lined with a substrate film is laid as such onto the lamination of ceramic green sheets to be press-bonded for further lamination. This procedure is repeated as many times as desired until a necessary number of laminated ceramic layers can be accomplished (Japanese Patent Kokai 5-36568 and 7-192955). This method is referred to hereinafter as the leaf bonding/peeling lamination method.

This leaf bonding/peeling lamination method is of course advantageously applied to the preparation of a laminated inductor device from ferrite green sheets having a thickness of 20 μm or smaller. A problem in the application of this method is that press-bonding and peeling of the substrate film must be repeated many times in lamination of every ferrite green sheet and, as the thickness of the ferrite green sheet is decreased, the peeling work of the substrate film must be performed with utmost care in order to avoid troubles in the ferrite green sheets of a so small thickness so that the working efficiency cannot be high enough requiring a long working time.

It is important accordingly to improve the working efficiency by decreasing the working time for peeling of the substrate film off the ceramic green sheet without occurrence of troubles in the ceramic green sheets such as breaking, crease formation and stretching.

SUMMARY OF THE INVENTION

The present invention accordingly has an object, in the preparation of a laminated inductor device by laminating a plurality of ceramic or ferrite green sheets of small dimensions having a thickness of 30 μm or smaller, to provide a laminated inductor device of high quality in high working efficiency without occurrence of troubles in the ferrite green sheets such as breaking, crease formation and stretching in the course of the peeling work of the substrate film from the ferrite green sheet.

Thus, the present invention provides, in a method for the preparation of a laminated ferrite inductor device comprising the steps of (a) forming a through-hole to penetrate a first laminated body consisting of a first substrate film and a first ferrite green sheet, (b) forming a coil pattern on the ferrite green sheet, (c) cutting the laminated body provided with a through-hole and a coil pattern into card-formed sheets, (d) removing the substrate film from the ferrite green sheet to give an unsupported ferrite green sheet as a base, (e) laying a second card-formed sheet on the base with the ferrite green sheet of the second card-formed sheet in contact with the base, (f) press-bonding the base and the second card-formed sheet, (g) removing the substrate film of the second card-formed sheet by peeling, (h) repeating the steps (a) to (g) to form a laminated block of ferrite green sheets and (i) sintering the laminated block of ferrite green sheets, the improvement which comprises forming, in addition to the coil pattern, a peel-facilitating pattern on the ferrite green sheet forming the laminated body with the substrate film and forming a snap groove in the ferrite green sheet along the outer periphery of the peel-facilitating pattern.

It is preferable that the above mentioned snap groove formed in the ferrite green sheet has a depth not smaller than the thickness of the ferrite green sheet to fully divide the ferrite green sheet but smaller than the total thickness of the ferrite green sheet and the substrate film so as not to cut apart the substrate film.

Further, the above mentioned peel-facilitating pattern is formed on the ferrite green sheet preferably by using an electroconductive printing paste in a line-formed pattern along the inward periphery of the snap groove to have a width of 1 to 2 mm and a thickness of 10 to 20 μm.

DETAILED DESCRIPTION OF THE PREFERRED EMBODIMENTS

Figure 1:
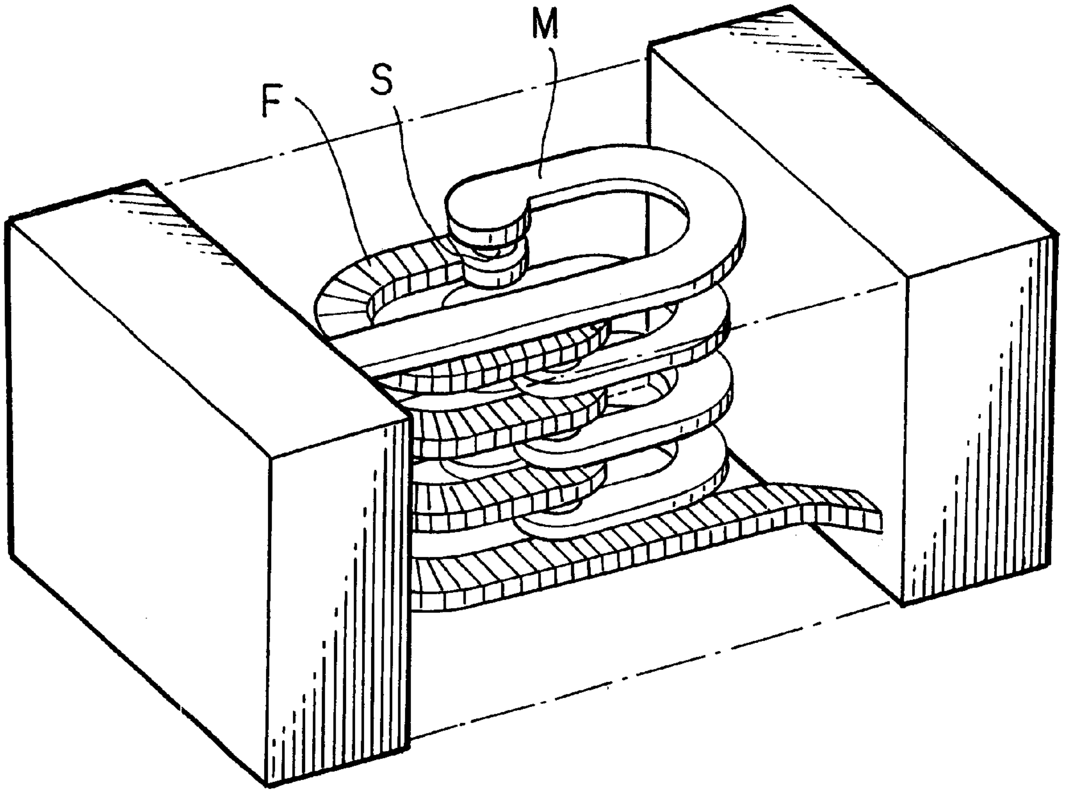
FIG. 1 PRIOR ART
FIG. 1 is a perspective view of a chip inductor as partially cut open to show the inside structure.
Figure 2:
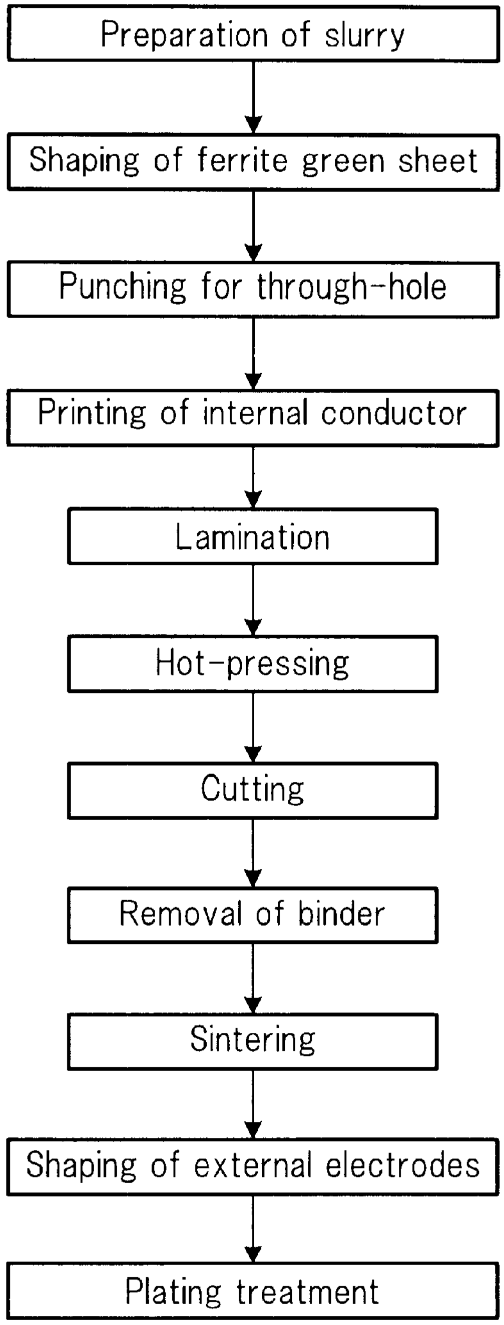
FIG. 2 PRIOR ART
FIG. 2 is a flow sheet diagram to show the process for the preparation of a chip inductor.

In the preparation of a laminated inductor device according to the improvement provided by the present invention, the laminated body consisting of a substrate film and a ceramic or, typically, ferrite green sheet is not particularly limitative and can be any of those conventionally used heretofore in the preparation of laminated chip inductors. The substrate film forming the laminated body can be a film of a variety of plastic resins such as polyethylene terephthalate, polybutylene terephthalate, polyethylene, polypropylene, polycarbonate and polyvinyl chloride, of which polyethylene terephthalate films are particularly preferable. The ferrite material forming the ferrite green sheet is a spinel ferrite or a hexagonal ferrite though not limitative thereto.

The substrate film has a thickness in the range from 30 to 100 μm or, preferably, from 38 to 80 μm. While the ferrite green sheet formed in the conventional methods has a thickness in the range from 5 to 50 μm, the advantage obtained by the preparation method according to the inventive improvement is quite remarkable when the ferrite green sheet has a relatively small thickness of 5 to 30 μm or, in particular, smaller than 20 μm.

The laminated body consisting of a substrate film and a ferrite green sheet can be prepared by a method in which a substrate film is coated by using a doctor blade with a slurry prepared by dispersing ferrite particles in a solution of a binder resin such as polyvinyl alcohol, carboxymethyl cellulose, butyral-based resins, acrylic resins and the like in water or an organic solvent such as mineral oils, alcohols and ketones followed by drying to form a dried ferrite green sheet as a layer of the ferrite particles having a thickness of 5 to 50 μm or, in particular, 5 to 30 μm on the surface of the substrate film.

In the preparation method according to the present invention, a through-hole is formed to penetrate the laminated body consisting of the substrate film and the ferrite green sheet by machine-punching or by laser working. Further, a coil pattern to serve as the internal conductor pattern and a peel-facilitating or reinforcing pattern are formed on the ferrite green sheet by the method of screen printing and the like with a conductive printing paste. The coil pattern and peel-facilitating pattern can be formed by conducting the screen printing either separately or simultaneously with an object to improve the working efficiency.

The above mentioned coil pattern is formed by the method of screen printing using a silver-, palladium- or silver/palladium-based electroconductive printing paste. The printing paste for the formation of the peel-facilitating pattern is not particularly limitative but it is convenient to employ the same printing paste as for the coil pattern although any conductive printing paste containing fine particles of other metals and/or alloys can be used therefor.

The peel-facilitating pattern usually has a frame-formed square or oblong rectangular contour though not particularly limitative thereto. The frame-formed pattern is formed with lines having, usually, a width of 0.5 to 3 mm or, preferably, 1 to 2 mm and a thickness of 10 to 20 μm.

It is essential in accomplishing the improvement according to the present invention that a snap groove or incision is formed in the ferrite green sheet along the outer periphery of the peel-facilitating pattern. Though not particularly limitative, the snap groove can be formed by machining or by laser working. Advantageously, the snap groove can be formed concurrently with formation of the through-hole in the laminated body. The snap groove must have a depth sufficient to reach the substrate film so as to accomplish complete incision in the ferrite green sheet. When the depth of the snap groove is too small to accomplish complete incision of the ferrite green sheet, a high-quality laminated inductor device can hardly be obtained. The snap groove has a width of 0.1 to 1 mm though not particularly limitative.

The improvement according to the present invention can be accomplished only by providing both of the peel-facilitating pattern and the snap groove in combination on and in the ferrite green sheet so as to fully prevent occurrence of defects in the ferrite green sheet by peeling of the substrate film. If either one of the peel-facilitating pattern and the snap groove is omitted, the desired improvement cannot be accomplished.

Figure 3:
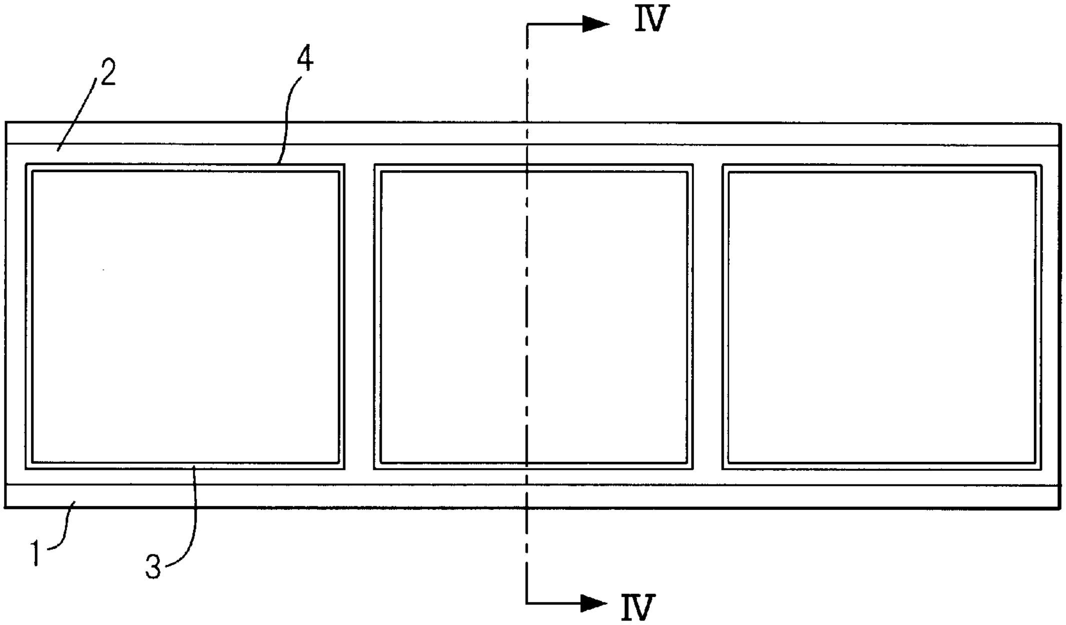
FIG. 3 is a plan view of a laminated body consisting of a substrate film and a ferrite green sheet used in the present invention.
Figure 4:
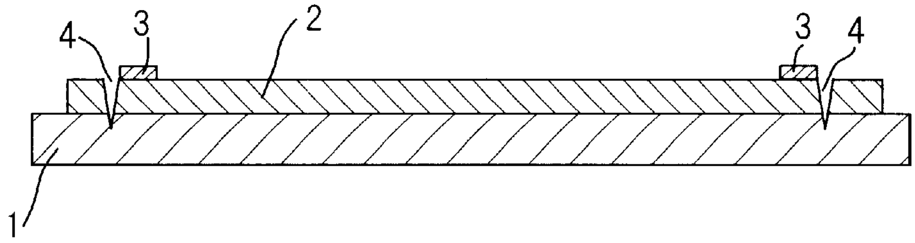
FIG. 4 is a cross sectional view of the laminated body illustrated in FIG. 3 as cut and viewed along the line IV—IV in FIG. 3.

FIG. 3 is a plan view of the laminated body consisting of a substrate film 1 and a ferrite green sheet 2 which is provided with a peel-facilitating pattern 3 and a snap groove 4. FIG. 4 is a cross sectional view of the same laminated body as cut and viewed along the line IV—IV in FIG. 3.

In the present invention, the laminated body consisting of a substrate film 1 and a ferrite green sheet 2 and provided with a penetrating through-hole therein, a coil pattern and a peel-facilitating pattern 3 formed by screen printing on the ferrite green sheet 2 and a snap groove 4 incising the ferrite green sheet 2 is prepared in the above described manner and this laminated body is cut and divided into a plurality of card-formed laminated bodies.

In the next place, a card-formed laminated body is fixedly held and the substrate film 1 is removed therefrom by peeling to give an unsupported ferrite green sheet 2 onto which a second card-formed laminated body is laid with the ferrite green sheet in direct contact with the first ferrite green sheet and they are bonded together by pressing followed by removal of the substrate film of the second laminated card body by peeling to give a laminate of two ferrite green sheets. This procedure of lamination of another laminated card body and removal of the substrate film is repeated as many times as desired until a multilayered laminated block consisting of a desired number of the ferrite green sheets is obtained. The thus obtained multilayered laminated block of ferrite green sheets is finally subjected to a sintering heat treatment to complete a laminated inductor device.

When the above described procedure is undertaken adequately, high-quality laminated inductor devices can be prepared with high productivity as freed from a decrease in the performance due to occurrence of defects in the ferrite green sheets such as breaking, crack formation and stretching which are sometimes unavoidable in the prior art by removal of the substrate film by peeling.

As is illustrated in FIG. 1 showing the internal structure of a laminated inductor device partially cut open, a spiral coil F is formed within the device by electrically connecting the coil patterns M with a via-conductor S, i.e. a conductive body of a conductive paste filling the through-holes. In the preparation of the laminated inductor device, accordingly, a penetrating through-hole is formed in the ferrite green sheet and silver electrodes are formed thereon by a method of screen printing followed by peeling of the substrate film from the ferrite green sheet. The printing work of the silver electrodes cannot be undertaken after peeling of the substrate film from the ferrite green sheet.

Figure 5:
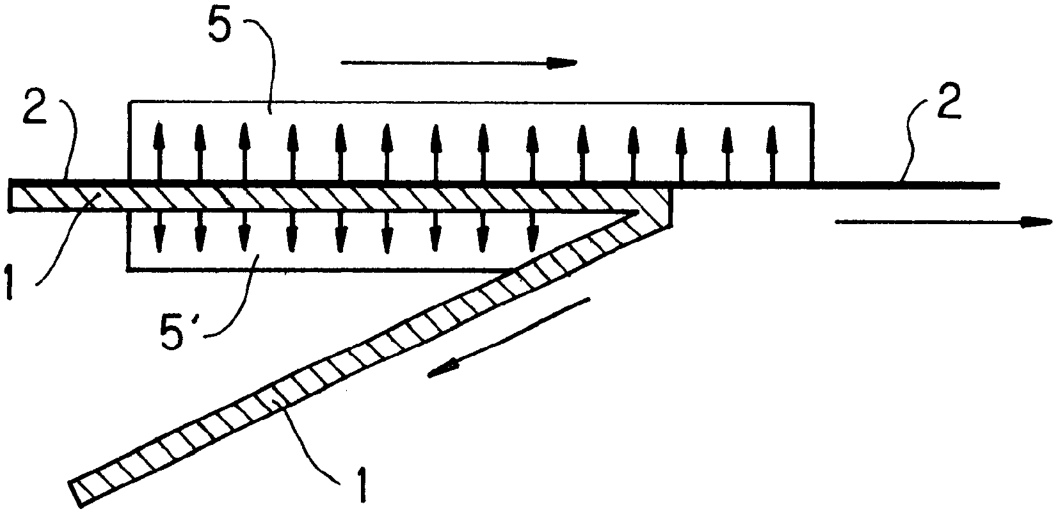
FIG. 5 PRIOR ART
FIG. 5 is a schematic cross sectional view of the device for peeling of the substrate film from the ferrite green sheet.

In conducting peeling work of the substrate film according to a prior art method, as is illustrated in FIG. 5 showing an apparatus for the removal of the substrate film from the ferrite green sheet by a schematic cross sectional view, the laminated body is held by a suction chucking means consisting of a first suction chuck 5 and a second suction chuck 5' at the ferrite green sheet 2 and at the substrate film 1, respectively, and the substrate film 1 and the ferrite green sheet 2 are separated by sliding the suction chucks 5, 5' relative to each other followed by cutting in a suitable length. When the thickness of the ferrite green sheet 2 is so small as in the present invention, the above described prior art method for peeling necessarily leads to occurrence of defects in the ferrite green sheet 2 such as breaking, crease formation and stretching.

Needless to say, peeling of the substrate film proceeds starting at the peel-starting point. When the ferrite green sheet has a relatively large thickness having a good mechanical strength, the above mentioned occurrence of defects in the ferrite green sheet can be prevented and the process of peeling proceeds smoothly even when the peel-starting point is not at a very precisely definite position. In contrast thereto, the peeling process cannot proceed so smoothly when the thickness of the ferrite green sheet is small leading to breaking of the sheet in the course of peeling or crease formation or stretching of the sheet due to uneven proceeding of peeling.

Figure 6A:
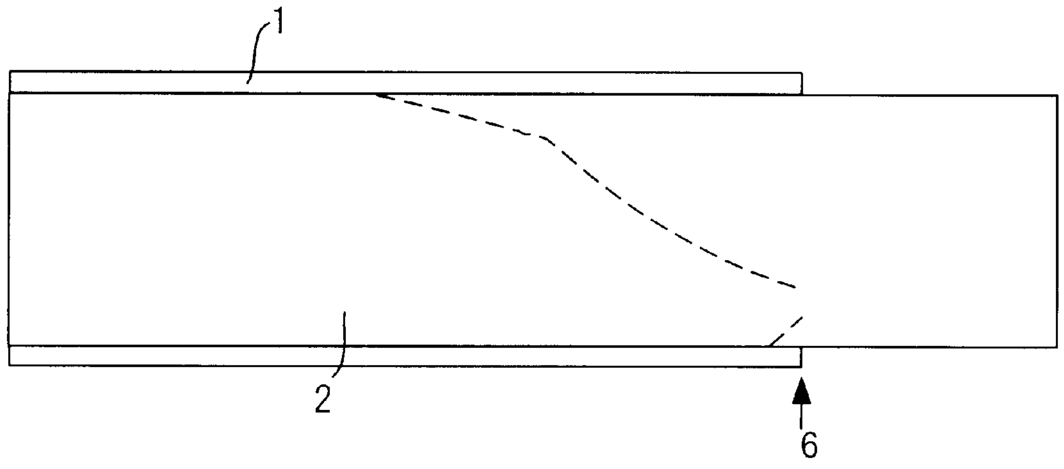
FIG. 6A PRIOR ART
FIGS. 6A and 6B are each a plan view of a laminated body under peeling for illustration of occurrence of defects in the ferrite green sheet.
Figure 6B:
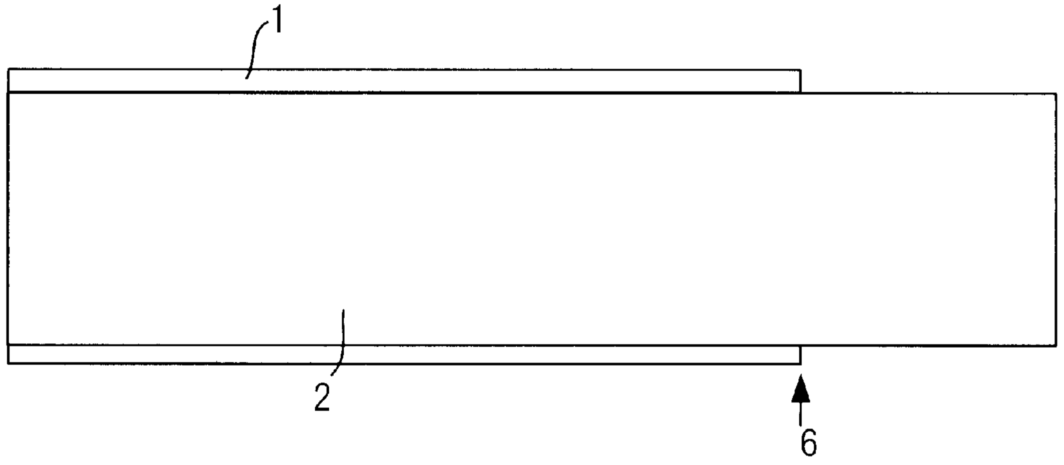
FIG. 6B PRIOR ART

FIGS. 6A and 6B illustrate the mechanism for the occurrence of defects such as breaking, crease formation and stretching in the ferrite green sheet by removal of the substrate film, of which FIG. 6A is for a sheet of a relatively small thickness and FIG. 6B is for a sheet of a relatively large thickness.

As is shown in FIG. 6A, breaking of the ferrite green sheet 2 of a small thickness starts at the peel-starting point 6 along the broken line leading to complete breaking of the sheet 2 or, if not leading to complete breaking, creases are formed in the sheet 2 or the sheet 2 is stretched. When the ferrite green sheet 2 has a relatively large thickness as is shown in FIG. 6B, peeling of the substrate film can proceed without occurrence of defects starting at the peel-starting point 6 in peeling of the substrate film 1.

Figure 7A:
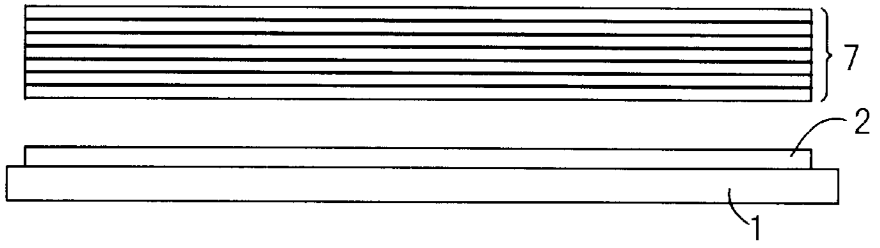
FIG. 7A PRIOR ART
FIGS. 7A, 7B and 7C each illustrate a step of the leaf bonding/peeling lamination method by a cross sectional view.
Figure 7B:
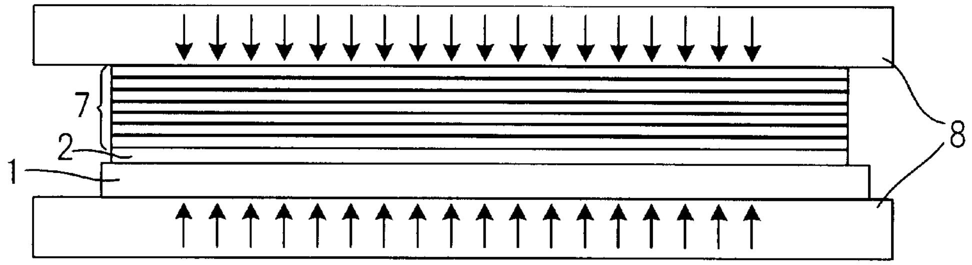
FIG. 7B PRIOR ART
Figure 7C:
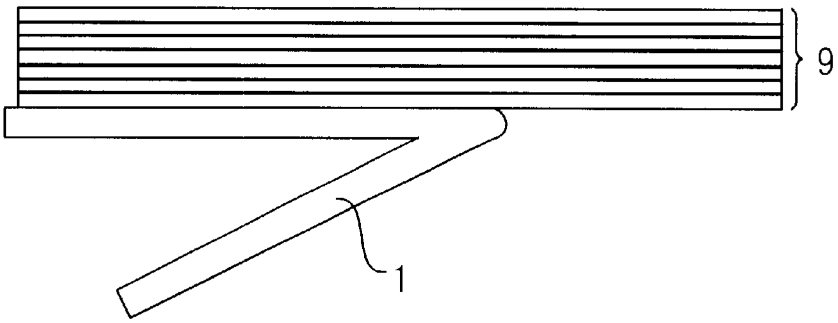
FIG. 7C PRIOR ART

FIGS. 7A, 7B and 7C illustrate each a step of the leaf bonding/peeling lamination method. In this lamination method, a laminated body consisting of a substrate film 1 and a ferrite green sheet 2 is overlaid at the ferrite green sheet 2 on another ferrite green sheet as a laminated block 7 of sheets with the ferrite green sheets in direct contact each with the other (FIG. 7A) followed by pressing with a presser plate 8 so as to effect integral bonding of the ferrite green sheets (FIG. 7B) into an integrally laminated block lined with a substrate film 1, from which the substrate film 1 is removed by peeling (FIG. 7C) to give a laminated block 9 of a plurality of the ferrite green sheets with a number of the integrated ferrite green sheets increased by one. The procedure of this method is equivalent to the procedure for the removal of a substrate film by peeling from a ferrite green sheet of a relatively large thickness.

Although this method involving peeling of a substrate film 1 from the laminate 9 is relatively easy as compared with a process in which every laminating bonding of a ferrite green sheet with another ferrite green sheet or with a laminate of sheets is preceded by a step of peeling of the substrate film from the ferrite green sheet, it is sometimes the case when the thickness of each of the ferrite green sheets is so small to be about 20 $\mu$m or smaller that peeling of the substrate film from the green sheet leads to occurrence of defects such as breaking, crease formation and stretching in the ferrite green sheet, which can be prevented by providing the ferrite green sheet with a peel-facilitating pattern and a snap groove according to the present invention.

The mechanism in occurrence of the above mentioned defects in the ferrite green sheet is presumably as follows. Namely, the surface of a laminated block consisting of a plurality of integrated ferrite green sheets is generally not flat enough as a consequence of the conductor pattern formed on each ferrite green sheet to be raised in the areas corresponding to the conductor patterns and recessed in the areas out of the conductor patterns sometimes leading to occurrence of a stepped level difference along the demarcation lines between the raised and recessed areas. When integral bonding of the ferrite green sheets is conducted by the leaf bonding/peeling lamination method under the above mentioned non-flat condition of the surface, the bonding pressure cannot be uniform enough over the whole surface under pressing resulting in unevenness of adhesive bonding between ferrite green sheets. Needless to say, uneven bonding between ferrite green sheets necessarily leads to occurrence of defects in the ferrite green sheet from which the substrate film is removed by peeling.

Figure 8:
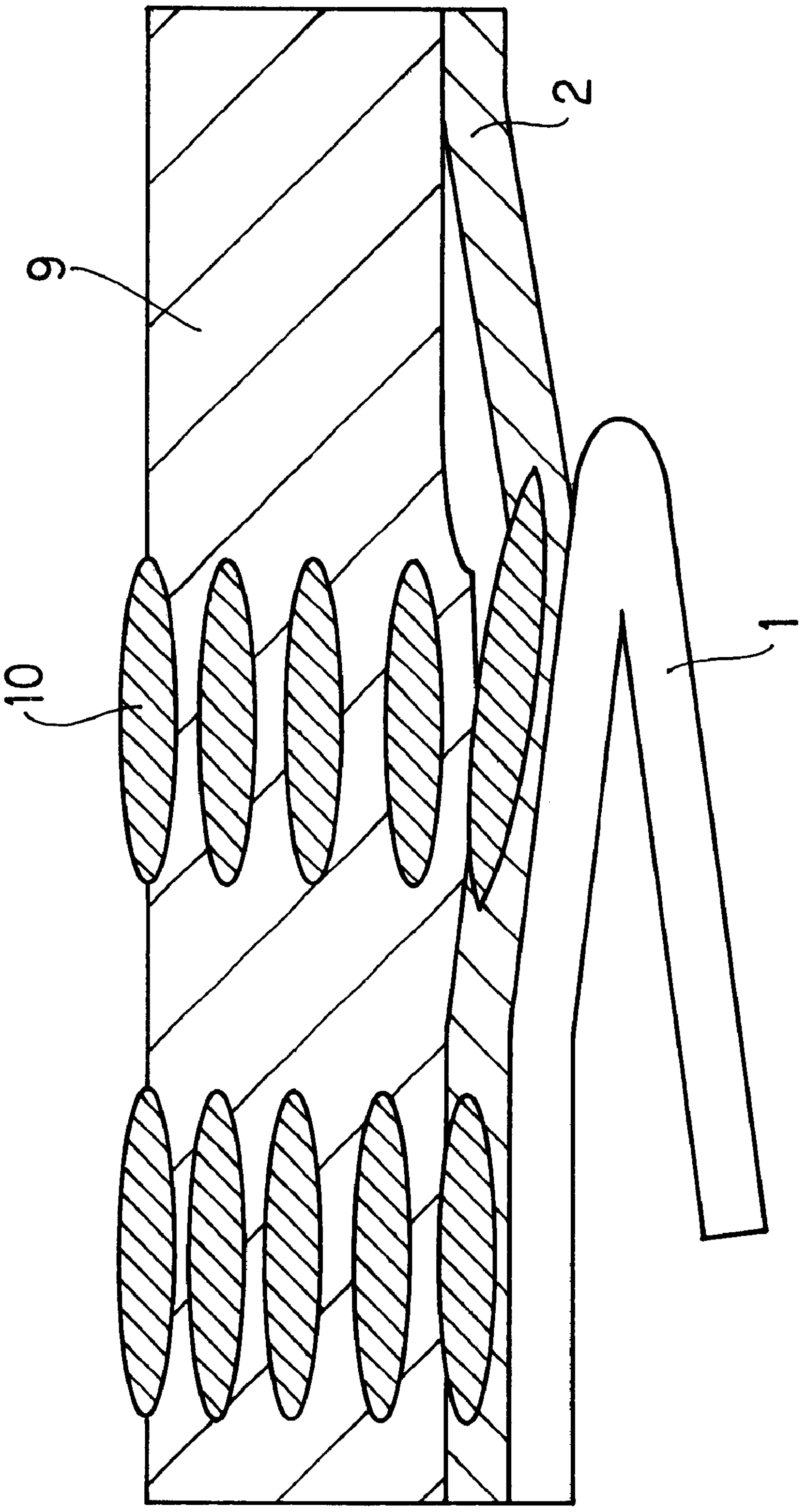
FIG. 8 PRIOR ART
FIG. 8 illustrates occurrence of defects in the ferrite green sheet by a cross sectional view in the leaf bonding/peeling lamination method.

FIG. 8 illustrates a typical state under occurrence of defects in the ferrite green sheet such as breaking, crease formation and stretching when the leaf bonding/peeling lamination method is undertaken by peeling the substrate film 1 from the ferrite green sheet 2 newly bonded to the laminated block 9 of four ferrite green sheets previously prepared, each green sheet bearing a conductor pattern 10 formed by printing with a conductive printing paste.

Occurrence of the above mentioned defects in the ferrite green sheet is particularly serious when the ferrite green sheets each have a complicated conductor pattern as in a laminated inductor device and more serious as a trend when the ferrite green sheets each have a through-hole.

This problem can be solved according to the present invention in which a measure is undertaken to increase the mechanical strength of the ferrite green sheet to withstand the peeling action by uniformizing location of the peel-starting points. As is illustrated in FIGS. 3 and 4, namely, a rectangular frame-formed snap groove 4 is formed in the ferrite green sheet 2 by engraving or incising and then a peel-facilitating pattern 3 is formed on the ferrite green sheet 2 by printing along the inner periphery of the frame-formed snap groove 4 to provide reinforcement and to decrease the. level difference with the areas corresponding to the conductor pattern formed on each of the laminated ferrite green sheets. By undertaking these measures, the substrate film 1 can be easily removed by peeling from the ferrite green sheet 2 without or with a decrease in the risk of occurrence of defects in the ferrite green sheet 2.

In the following, the present invention is illustrated in more detail by way of an Example.

EXAMPLE

A magnetic powder slurry was prepared by uniformly blending particles of a Ni/Zn/Cu oxide-based ferrite in toluene containing a butyral resin-based organic binder.

A film of polyethylene terephthalate resin as the substrate film having a thickness of 50 $\mu$m was coated with the above prepared ferrite powder slurry by using a doctor blade followed by drying to form a coating layer as a ferrite green sheet having a varied thickness of 3, 5, 10, 15, 20 or 30 $\mu$m.

Each of the thus obtained laminated bodies consisting of a substrate film and a ferrite green sheet was provided with a penetrating through-hole having a diameter of 80 $\mu$m by laser works and concurrently provided by incision with a snap groove in a rectangular frame-formed profile. The depth of incision was either sufficient to effect complete incision of the ferrite green sheet reaching the substrate film or insufficient to reach the bottom surface of the ferrite green sheet. Thereafter, the ferrite green sheet of each of the laminated bodies was provided on the surface with a coil pattern as an internal conductor by screen printing with an electroconductive silver paste concurrently with formation of a via-conductor and a peel-facilitating pattern.

The peel-facilitating pattern for reinforcement had a varied thickness of 6, 10, 12, 15, 20 or 30 $\mu$m and a varied width of 0.3, 0.5, 1.0, 1.5, 2.0, 3.0 or 5.0 mm by varying the repeating number of printing and by varying the printing pressure.

Eight groups of one hundred per group of 800 laminated bodies were prepared as described above, i.e. Groups I to VIII. The ferrite green sheets in Groups I to IV had a thickness of 20 $\mu$m and the ferrite green sheets in Groups V to VIII had a thickness of 15 $\mu$m. They were not provided or provided with a snap groove having an incision depth to reach or not to reach the bottom surface of the ferrite green sheet, referred to as heavy incision and light incision, respectively, hereinafter, and not provided or provided with a peel-facilitating reinforcement pattern having a thickness of 12 $\mu$m and width of 1 mm as indicated below. These laminated bodies were subjected to a peeling test of the substrate film and the results were recorded in each of the Groups I to VIII for the percentage of successful peeling tests without occurrence of defects in the ferrite green sheet. The results were as follows.

Group I: snap groove, heavy incision; peel-facilitating pattern, yes; successful peeling, 100%

Group II: snap groove, light incision; peel-facilitating pattern, yes; successful peeling, 36%

Group III: snap groove, light incision; peel-facilitating pattern, no; successful peeling, 38%

Group IV: no snap groove; peel-facilitating pattern, yes; successful peeling, 25%

Group V: snap groove, heavy incision; peel-facilitating pattern, yes; successful peeling, 100%

Group VI: snap groove, light incision; peel-facilitating pattern, yes; successful peeling, 45%

Group VII: snap groove, light incision; peel-facilitating pattern, no; successful peeling, 63%

Group VIII: no snap groove; peel-facilitating pattern, yes; successful peeling, 40%

The above given results lead to a conclusion that improvement in the peelability of the substrate film cannot be complete when either of the snap groove or peel-facilitating pattern is omitted and that the incision depth for the formation of the snap groove should be sufficient to reach the bottom surface of the ferrite green sheet to accomplish full improvement in the peelability of the substrate film from the ferrite green sheet.

Peeling tests of the substrate film from the ferrite green sheet of a laminated body were undertaken in substantially the same manner as above by using laminated bodies of which the ferrite green sheets each had a different thickness of 3 to 30 $\mu$m with or without providing a snap groove and without or with providing s peel-facilitating pattern having a thickness of 10, 12 or 15 $\mu$m and a width of 1 or 2 mm.

Table 1 below shows the results of the peeling tests for the variety of laminated bodies.

TABLE 1

| Thickness of ferrite green sheet, μm | Depth of snap groove | Peel-facilitating pattern Thickness μm | Peel-facilitating pattern Width, mm | Successful peeling, % |
|---|---|---|---|---|
| 3 | heavy | — | — | 10 |
| 3 | — | 12 | 1 | 25 |
| 3 | heavy | 12 | 1 | 40 |
| 5 | heavy | 12 | 2 | 89 |
| 10 | heavy | 10 | 1 | 95 |
| 15 | heavy | 12 | 1 | 100 |
| 20 | heavy | 12 | 1 | 100 |
| 30 | heavy | 12 | 1 | 100 |
| 30 | heavy | 15 | 1 | 100 |
| 30 | light | 12 | 1 | 100 |
| 30 | heavy | — | — | 91 |
| 30 | — | — | — | 90 |
| 50 | light | 12 | 1 | 100 |
| 50 | heavy | — | — | 95 |
| 50 | — | — | — | 97 |

The results shown in Table 1 led to a conclusion that remarkable improvements could be obtained in the peelability of the substrate film according to the present invention to provide a snap groove and a peel-facilitating pattern in and on the ferrite green sheet when the ferrite green sheet had a thickness of 5 to 20 μm although improvements to some extent could be obtained when the ferrite green sheet had a thickness smaller than 5 μm or larger than 20 μm.

Table 2 below shows the results of the peeling tests undertaken in substantially the same manner as above for laminated bodies having a ferrite green sheet of always 20 μm thickness and provided with a snap groove of an always heavy incision depth and a peel-facilitating pattern having a varied thickness indicated in the table.

Further, Table 3 below shows the results of the peeling test undertake in the same manner as above except that the ferrite green sheets always had a thickness of 15 μm instead of 20 μm.

TABLE 2

| Peel-facilitating pattern Thickness, μm | Peel-facilitating pattern Width, mm | Successful peeling, % |
|---|---|---|
| 6 | 1 | 66 |
| 6 | 1.5 | 70 |
| 10 | 1 | 92 |
| 12 | 1 | 100 |
| 15 | 1 | 100 |
| 20 | 1 | 95 |
| 30 | 1 | 75 |
| 30 | 2 | 70 |
| 12 | 0.3 | 48 |
| 20 | 0.3 | 65 |
| 12 | 0.5 | 91 |
| 12 | 1.5 | 100 |
| 12 | 2 | 100 |
| 12 | 3 | 93 |
| 12 | 5 | 67 |

TABLE 3

| Peel-facilitating pattern Thickness, μm | Peel-facilitating pattern Width, mm | Successful peeling, % |
|---|---|---|
| 6 | 1 | 55 |
| 6 | 1.5 | 60 |
| 10 | 1 | 96 |
| 12 | 1 | 100 |
| 15 | 1 | 100 |
| 20 | 1 | 96 |
| 30 | 1 | 85 |
| 30 | 2 | 80 |
| 12 | 0.3 | 50 |
| 20 | 0.3 | 61 |
| 12 | 0.5 | 93 |
| 12 | 1.5 | 100 |
| 12 | 2 | 100 |
| 12 | 3 | 90 |
| 12 | 5 | 70 |

The results shown in these tables lead to a conclusion that, in order to accomplish full improvements in the peelability of the substrate film from the ferrite green sheet, the peel-facilitating pattern should have a width of 0.5 to 3 mm and a printing thickness of 10 to 20 μm or, preferably, a width of 1 to 2 mm and a printing thickness of 12 to 15 μm to accomplish more remarkable improvements.

On the other hand, improvements in the peelability of the substrate film are decreased when the peel-facilitating pattern has a width smaller than 0.5 mm and a printing thickness smaller than 10 μm and flatness of the surface of the ferrite green sheet is decreased when the peel-facilitating pattern has a width exceeding 3 mm and a printing thickness exceeding 20 μm leading to a decrease in the percentage of successful peeling tests.

What is claimed is:

1. In a method for the preparation of a laminated inductor device comprising the steps of: (a) forming a through-hole to penetrate a first laminated body consisting of a first substrate film and a first ferrite green sheet; (b) forming a coil pattern on the ferrite green sheet; (c) removing the substrate film from the ferrite green sheet in the laminated body by peeling to give an unsupported ferrite green sheet; (d) laying a second laminated body consisting of a second substrate film and a second ferrite green sheet and provided with a penetrating through-hole and a coil pattern on the second ferrite green sheet with the first and second ferrite green sheets in direct contact each with the other; (e) press-bonding the first and second ferrite green sheets to form a laminate of ferrite green sheets, (f) removing the second substrate film from the second ferrite green sheet by peeling to give a laminate of the ferrite green sheets, (g) repeating the steps (a) to (f) to form a laminated block of a plurality of ferrite green sheets and (h) subjecting the laminated block of the ferrite green sheets to a sintering heat treatment, the improvement which comprises forming a peel-facilitating pattern on at least one of the ferrite green sheets and forming a snap groove having an incision depth sufficient to reach the bottom surface of the ferrite green sheet but not to cut apart the substrate film in at least one of the ferrite green sheets provided with a peel-facilitating pattern, along the outer periphery of the peel-facilitating pattern.

2. The method as claimed in claim 1 in which the peel-facilitating pattern has a profile of a rectangular frame.

3. The method as claimed in claim 1 in which the peel-facilitating pattern is formed by printing with a printing paste.

4. The method as claimed in claim 3 in which the peel-facilitating pattern formed by printing has a line width in the range from 1 to 2 mm and a thickness in the range from 10 to 20 μm.

5. The method according to claim 1 wherein each of the ferrite green sheets has a thickness in the range of from 5 to 30 μm.

6. The method according to claim 1 wherein the peel-facilitating pattern has a width of 0.5 to 3 mm and a thickness of 10 to 20 μm.

* * * * *